(12) United States Patent
Yonovitz et al.

(10) Patent No.: US 7,151,835 B2
(45) Date of Patent: Dec. 19, 2006

(54) PERSONAL NOISE MONITORING APPARATUS AND METHOD

(76) Inventors: Al Yonovitz, 1 Fenton Court, Marrara NT (AU) 0812; Leslie Yonovitz, 1 Fenton Court, Marrara NT (AU) 0812

( * ) Notice: Subject to any disclaimer, the term of this patent is extended or adjusted under 35 U.S.C. 154(b) by 574 days.

(21) Appl. No.: 10/401,708

(22) Filed: Mar. 28, 2003

(65) Prior Publication Data

US 2004/0190729 A1    Sep. 30, 2004

(51) Int. Cl.
*G08B 23/00*    (2006.01)
(52) U.S. Cl. .................. 381/56; 340/540; 340/573.1; 73/573.1; 73/646; 381/72
(58) Field of Classification Search ............... 381/56, 381/372, 71.6, 72; 340/573.1, 540, 683; 73/573.1, 645, 646, 648
See application file for complete search history.

(56) References Cited

U.S. PATENT DOCUMENTS

| | | | | |
|---|---|---|---|---|
| 3,747,703 A | * | 7/1973 | Knowd et al. | 73/648 |
| 3,778,552 A | * | 12/1973 | Edinborgh | 73/645 |
| 4,060,701 A | * | 11/1977 | Epley | 73/599 |
| 4,257,273 A | * | 3/1981 | Knowd | 73/647 |
| 4,284,847 A | * | 8/1981 | Besserman | 73/585 |
| 4,307,385 A | * | 12/1981 | Evans et al. | 340/540 |
| 4,424,511 A | * | 1/1984 | Alberts, Jr. | 73/646 |
| 6,035,719 A | * | 3/2000 | Toyota | 73/649 |
| 6,456,199 B1 | * | 9/2002 | Michael | 340/573.1 |
| 2003/0088324 A1 | * | 5/2003 | Hamelink | 700/90 |

* cited by examiner

*Primary Examiner*—Vivian Chin
*Assistant Examiner*—Jason Kurr

(57) ABSTRACT

The present invention relates to a method, system and device for monitoring noise received by individuals operating in noisy environments.

The device comprises a substantially credit card size housing and can be worn as a "badge". The device includes a monitoring means for monitoring sound, and a display for displaying various noise parameter values, including a percentage value of cumulative noise dose received by the device. The device includes an input key which enables a user to select one of a plurality types of hearing protection equipment, so the user can indicate to the device the hearing protection equipment they are wearing. This enables the device to monitor compliance. The device also includes an input key enabling the user to acknowledge when an unallowable noise dose level has been reached.

13 Claims, 12 Drawing Sheets

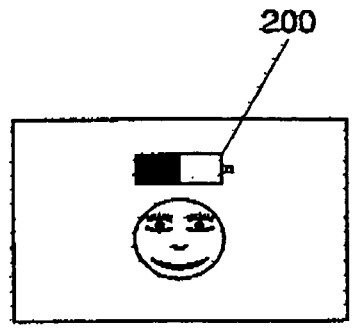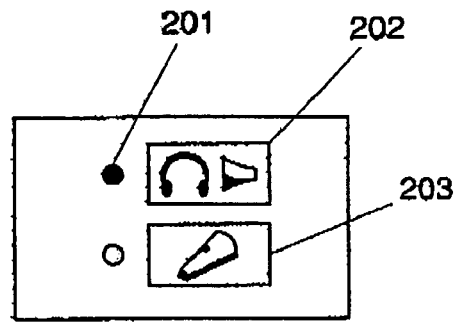
Fig.7A            Fig.7B
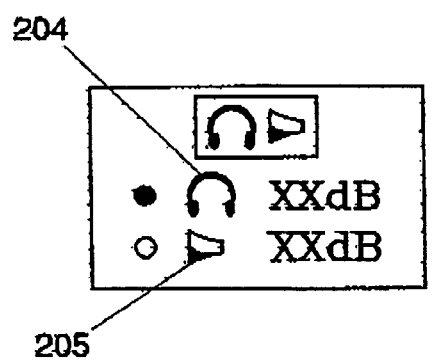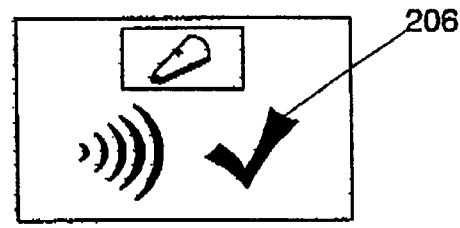
Fig.7C            Fig.7D
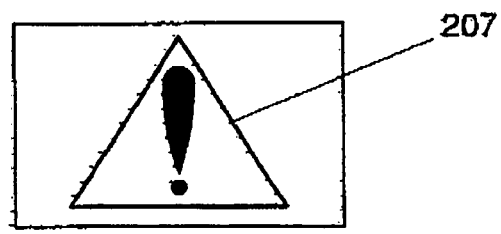
Fig.7E

| EMPLOYEES SIGNIFICANT EXPOSURE GREATER THAN 100% BETWEEN 1/1/03 - 30/6/03 | | | | |
|---|---|---|---|---|
| EMPLOYEE No | NAME | DATE OF EXPOSURE | EXPOSURE % | COMPLIANCE % |
| 10001 | Smith Robert | 9/2/03 | 125 % | YES |
| 10105 | Cain Mike | 12/2/03 | 112 % | YES |

Fig.12A

| NON COMPLIANCE & EXPOSURE GREATER THAN 100% BETWEEN 1/1/03 - 30/6/03 | | | | |
|---|---|---|---|---|
| EMPLOYEE No | NAME | DATE OF EXPOSURE | EXPOSURE % | COMPLIANCE % |
| 10001 | Smith Robert | 10/2/03 | 162 % | NO |
| 10105 | Cain Mike | 2/2/03 | 142 % | NO |

Fig.12B

PERSONAL NOISE MONITORING APPARATUS AND METHOD

FIELD OF THE INVENTION

The present invention relates to a method, system and device for monitoring noise, and, particularly, but not exclusively, to a method, system and device, for monitoring noise received by individuals operating in noisy environments.

BACKGROUND OF THE INVENTION

Many countries set strict standards for noise exposure of personnel operating in environments where they may experience excessive noise levels and accumulated exposure time, such as a workplace. These standards specify values for noise level parameters including the accumulated (integrated) amount of noise, the maximum level of noise and peak level (eg. 140 dB) to which an individual has been exposed during a workshift. Standards may also regulate other noise parameters.

In many jurisdictions, individuals exposed to noise over a predetermined value (in the US the value is 85 dBA Time Weighted Average (TWA)) are required to be included in a hearing conservation program, where they are individually monitored for noise exposure and regular hearing tests are required.

In order to comply with the standards and to ensure that personnel are protected, it is necessary for organisations to monitor noise levels in the environment where the personnel are operating and to assess individuals' exposure to noise (as well as providing regular hearing tests).

Conventionally, audio or noise dosimeters are used to monitor noise levels. These devices include a detector, such as a microphone, for detecting noise, and electronic circuitry for determining noise level in the detection area. Dosimeters are used in two ways:

1. To sample noise within areas in the environment by being placed within the areas for a predetermined period of time;
2. To sample noise levels experienced by a person by occasional wearing of dosimeters by individuals. Noise dosimeters are, therefore, "sampling" devices.

They provide samples of ambient noise from which subsequent calculations are made to estimate noise exposure for personnel.

They are complex to operate and must be implemented by professionally trained staff, such as acousticians and industrial safety hygienists. They provide technical data which require professional interpretation.

Noise dosimeters, therefore, provide only occasional data from sampled areas in the workplace and require technical training to use.

The use of conventional noise dosimetry can, therefore, at best only provide an estimate of each individuals level of noise exposure. The estimate will be inaccurate for a number of reasons, including:

1. Workers tend to move from place to place within a workplace and not remain at their designated station, where noise level samples may have been taken.
2. Noise levels vary over time. Occasional sampling of noise levels (as with conventional dosimetry) does not, therefore, give a complete picture.
3. Each individual is not constantly monitored. The estimate of noise dosage that each individual is receiving cannot, therefore, be entirely accurate.
4. Conventional noise dosimetry provides no indication of an individual's compliance to wearing hearing protection equipment. Noise level and dosage estimates usually do not take into account hearing protection equipment that is required to be worn by an individual (for example, ear muffs and/or ear plugs) and furthermore if the individual does not comply, this will also affect the accuracy of the estimate.

Another problem with conventional monitoring techniques is that they do not provide the individual with any immediate feedback. On a day to day basis, therefore, an individual will not know whether the noise levels they have been exposed to may have exceeded the standard limits. They have no way of knowing.

SUMMARY OF THE INVENTION

In accordance with a first aspect, the present invention provides a noise monitoring device arranged to be carried by a user, comprising a monitoring means for monitoring a noise parameter, and a hearing protection determination means for determining user compliance with wearing of hearing protection equipment.

Preferably, the hearing protection determination means includes a designation means enabling a user to designate to the device one of a plurality of types of hearing protection equipment, whereby to indicate to the device the type of hearing protection equipment they are wearing.

The device preferably includes a memory which is arranged to store noise information which includes hearing protection equipment data. The hearing protection equipment data preferably includes data identifying a sound attenuation value of the hearing protection equipment designated by the user.

The device thus provides an ability for monitoring of the user's compliance to wearing hearing protection equipment. This has the advantage that user compliance can be monitored by an appropriate authority, eg. management of a workplace, in order to better safeguard a user's hearing.

The device is preferably mounted by a housing which is arranged to be worn by a person at a position below head level.

Preferably, the device further includes an indicator means for indicating to the user when a noise parameter value has been reached.

The noise parameter may be the noise received cumulatively over a period of time. This is known as the "noise dose". A device may provide information on noise dose received during a monitoring period (eg. workshift).

Preferably, the indicator is a visible indicator and the noise level monitoring device is preferably arranged to be worn by a user on the outside of their clothing so that the indicator is visible to the user, and preferably to others (eg. co-worker, supervisor).

Preferably, such a device is assigned to each individual of a group of individuals who require noise level monitoring.

The device in a preferred embodiment operates as a form of personal protection equipment. This is in contrast to conventional noise dosimeters which are devices for occasionally monitoring noise parameters (intensity and accumulation over time) within the environment from which estimates of noise dose can be extrapolated. They are not associated with individuals and do not operate as personal protection equipment. They have no indicators to indicate to the individual that an allowable noise level has been reached or exceeded.

The device is preferably provided with an acknowledgment means enabling the wearer to acknowledge that they are aware that a predetermined noise dose value has been reached. In a preferred embodiment, the acknowledgment means includes an input key, which is actuated by the user. This has the advantage that an administrator/manager can ascertain that a user was aware that the noise dose value has been reached. Preferably, the predetermined noise dose value is an allowable noise dose ie. a noise dose which it has been determined a user should not exceed. Allowable noise doses may be regulated by governing authorities. An administrator/manager can therefore ascertain that a user was aware that their maximum allowable noise dose had been reached.

The device is preferably arranged to store noise information including data on noise dose received and also whether the acknowledgment button has been actuated.

The noise level monitoring device also preferably includes a calculation means for calculating an adjusted noise parameter value. The adjusted noise parameter value takes into account an attenuation effect of any hearing protection equipment being worn by the user.

Preferably, a display is provided to indicate whether hearing protection equipment has been designated, and the type (eg. ear muffs, ear plugs, both, etc).

In use, the device is preferably worn so that the display is visible, so that other persons in the workplace may see the display and determine whether the person wearing the device is complying by wearing the hearing protection equipment that is designated.

The noise monitoring device is preferably arranged to transfer noise information to a noise monitoring system. The information preferably includes noise level dosage; adjusted noise dosage; data on acknowledgment by the user of having reached or exceeded allowable noise level dose; compliance information relating to wearing of noise protection equipment.

In accordance with a second aspect, the present invention provides a noise monitoring system, for monitoring noise exposure of personnel, comprising a database which is arranged to receive personal noise monitoring information from noise monitoring devices associated with individual personnel, the noise monitoring information including hearing protection equipment data including information on hearing protection equipment worn by personnel during a monitoring period.

In accordance with a third aspect, the present invention provides a method of monitoring noise exposure of personnel, comprising the steps of assigning each person of the personnel a noise monitoring device, which the person is required to carry for a monitoring period, the device including a hearing protection determination means for determining user compliance with wearing of hearing protection equipment.

Preferably, the hearing protection determination means includes a designation means enabling a user to designate to the device one of a plurality of types of hearing protection equipment, in order to indicate to the device the type of hearing protection equipment they are wearing. The method preferably comprises the further step of monitoring the designation of the hearing protection equipment by the user.

In accordance with a fourth aspect, the present invention provides a noise monitoring device arranged to be carried by a user, the noise monitoring device comprising a monitoring means for monitoring a noise parameter, and an indication means for indicating to the user when a noise parameter value has been exceeded.

In accordance with a fifth aspect, the present invention provides a noise monitoring device arranged to be carried by a user, the noise monitoring device comprising a monitoring means for monitoring a noise parameter, the noise parameter being a noise dose value received by the person over a monitoring period.

In accordance with a sixth aspect, the present invention provides a noise monitoring device arranged to be carried by a user, the noise monitoring device comprising a monitoring means for monitoring a noise parameter, and an acknowledgment means actuatable by the user to acknowledge when a noise parameter value has been reached.

In accordance with a seventh aspect, the present invention provides a noise monitoring system for monitoring noise exposure of personnel, comprising a database which is arranged to receive noise monitoring information from noise monitoring devices associated with individual personnel, the noise monitoring information including acknowledgment data, indicating whether a person has acknowledged that a noise parameter value has been reached.

In accordance with an eighth aspect, the present invention provides a method of monitoring noise exposure of personnel, comprising the steps of assigning each person of the personnel with a noise monitoring device, which the person is required to carry for a monitoring period, the device including acknowledgment means enabling each person to acknowledge that a noise parameter value has been reached, the method comprising the further step of monitoring acknowledgment data stored by the devices to determine which persons have acknowledged that a noise parameter value has been reached.

BRIEF DESCRIPTION OF THE DRAWINGS

Features and advantages of the present invention will become apparent from the following description of an embodiment thereof, by way of example only, with reference to the accompanying drawings, in which:

FIGS. 7A–7I are illustrations of various screen displays of the device of FIG. 1 during various phases of operation;

FIGS. 12A and 12B are examples of reports on employees noise exposure and non compliance and exposure, produced by the noise monitoring system of FIG. 7.

DESCRIPTION OF PREFERRED EMBODIMENT

Figure 1:
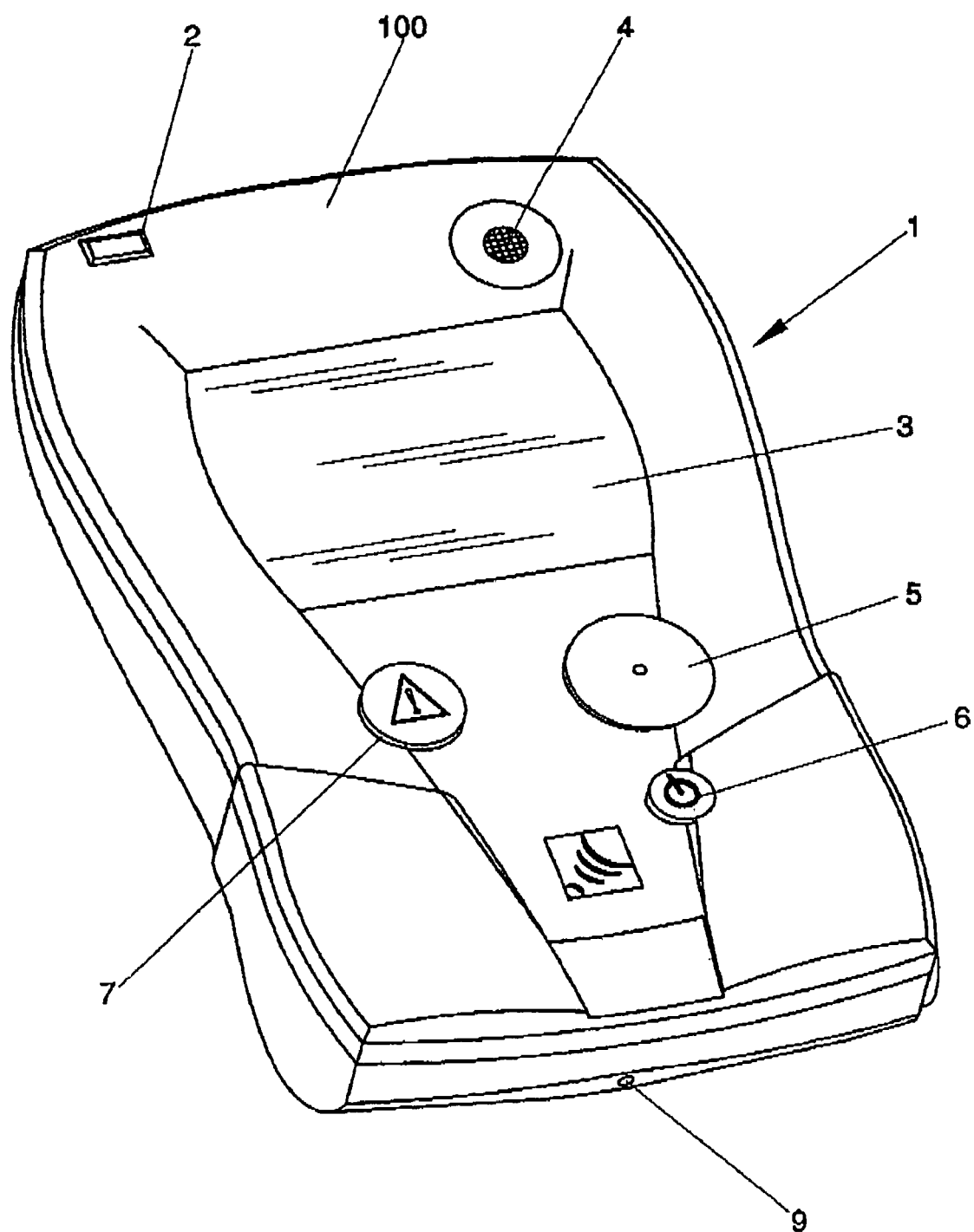
FIG. 1 is a perspective view from the front of a noise monitoring device in accordance with an embodiment of the present invention.
Figure 2:
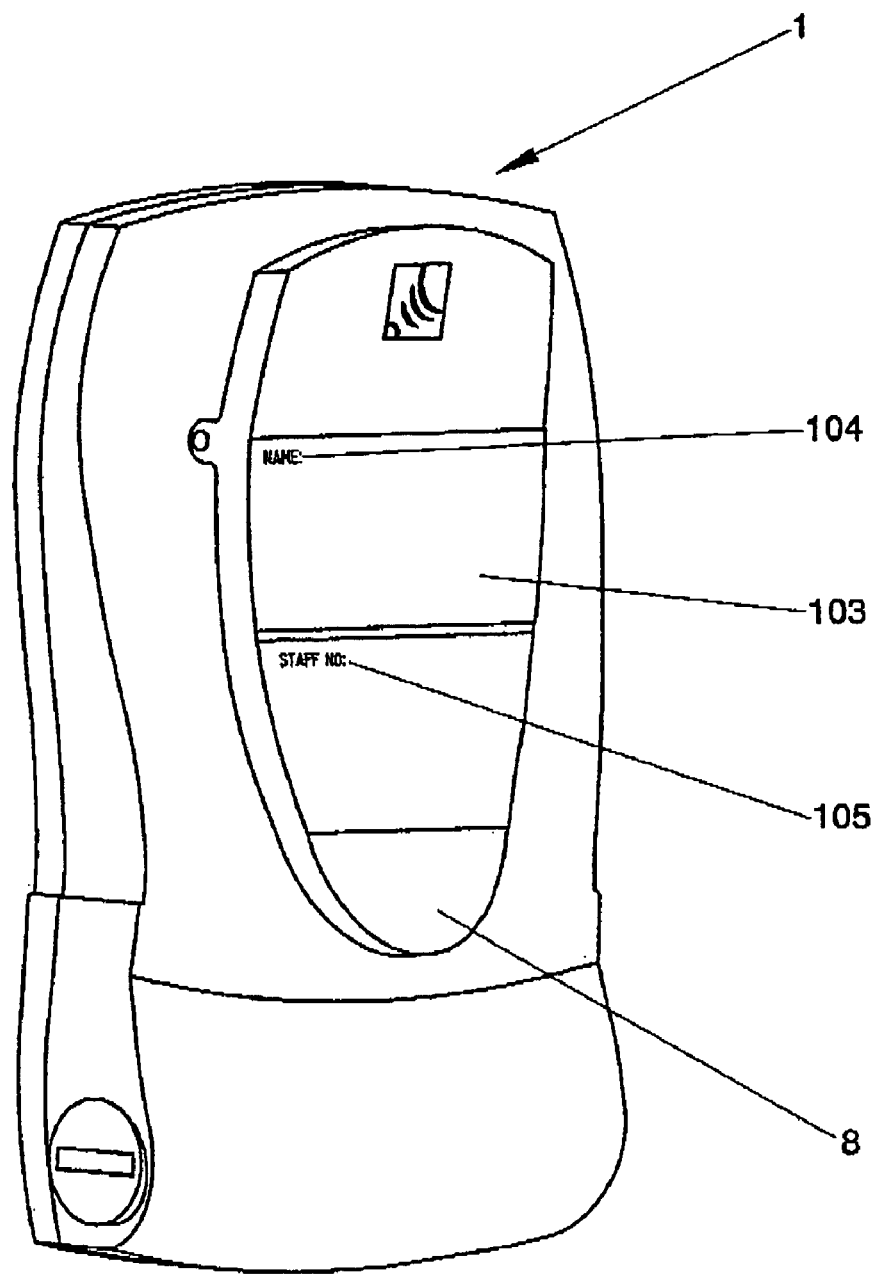
FIG. 2 is a perspective view from the rear and one side of the noise level monitoring device of FIG. 1.

With reference to FIGS. 1 and 2, a noise monitoring device is generally designated by reference numeral 1. The device includes a noise monitoring means and a designation means, being in this embodiment an input key 5, which enables the user to designate to the device one of a plurality of types of hearing protection equipment, so that the user can indicate to the device the type of hearing protection equipment they are currently wearing during a noise monitoring period.

The device further includes an indicator 2 for indicating to the user when a noise parameter value has been exceeded. In this embodiment, the indicator 2 includes an LED mounted at the top of a device housing 100. The LED 2 is arranged to flash when a noise parameter value has been exceeded. In this embodiment, a further indicator means includes the display 3, which displays noise parameter value information, in this example in the form of numbers indicating noise parameter values. This is further described later.

In more detail, the monitoring device 1 comprises a housing 100 which mounts noise monitoring and processing circuitry (see later description with reference to FIG. 8) and includes display 3, in this example being an LCD display, a microphone 4 for detecting noise levels, and input keys 5, 6, and 7.

The device 1 is intended to be-assigned to an individual in the workplace. An individual (or "user") is expected to wear the device 1 at all times during a noise monitoring period (for example, this may be when they are at work during a work shift). The device 1 includes a clip 8 arranged to attach the device 1 to a user's clothing so that the device 1 is mounted externally of the user's clothing with the indicator 2 and display 3 exposed outwardly.

In use, the device 1 is intended to be placed on the upper chest (eg. on the outside of a pocket), or upper arm (arm band). Alternatively, the device 1 can be clipped to a belt with an extension microphone clipped to the user's collar.

These positions for the microphone are well-established and widely-accepted placements for dosimetry.

Figure 3:
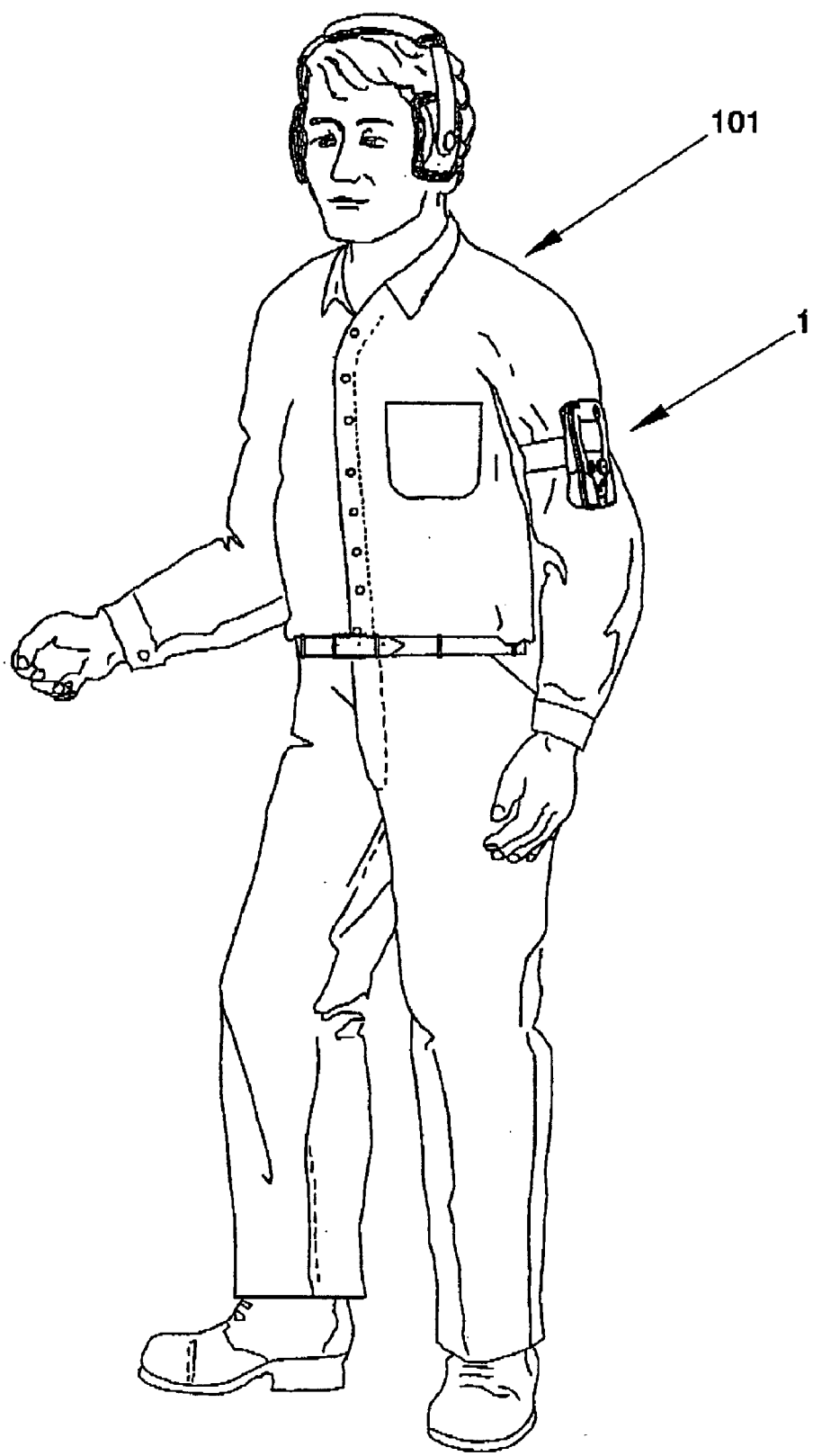
FIG. 3 is a schematic view showing the noise level monitoring device of FIG. 1 as worn by a user.

FIG. 3 illustrates device 1 carried on the upper arm of a user 101, by way of the clip 8 being strapped to an arm band or a pocket in the user's 101 shirt.

Figure 4:
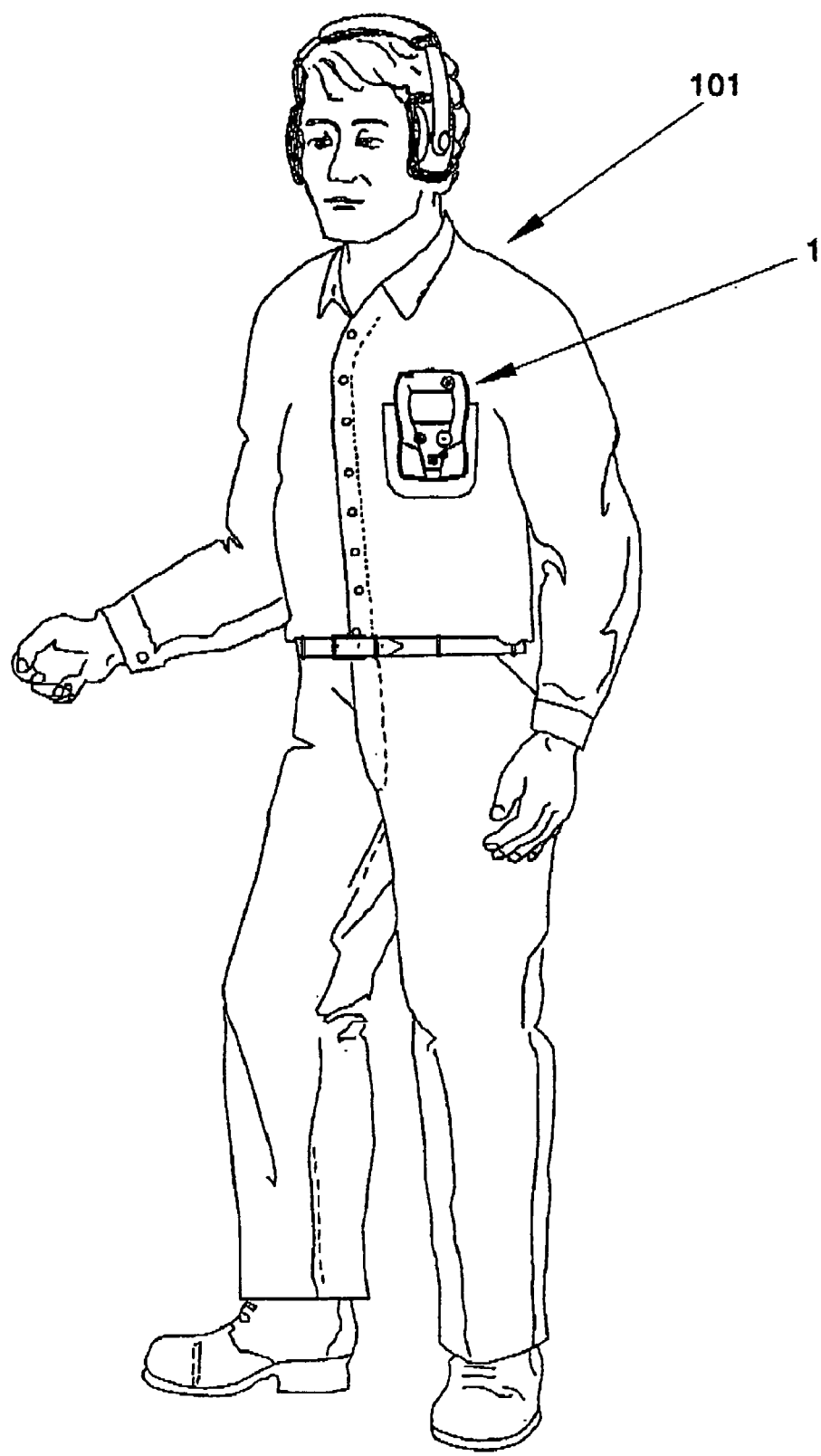
FIG. 4 is a schematic view showing the noise level monitoring device of FIG. 1 as worn in an alternative position by the user.

FIG. 4 illustrates a device 1 clipped at chest level to a shirt pocket of a user 101.

Figure 5:
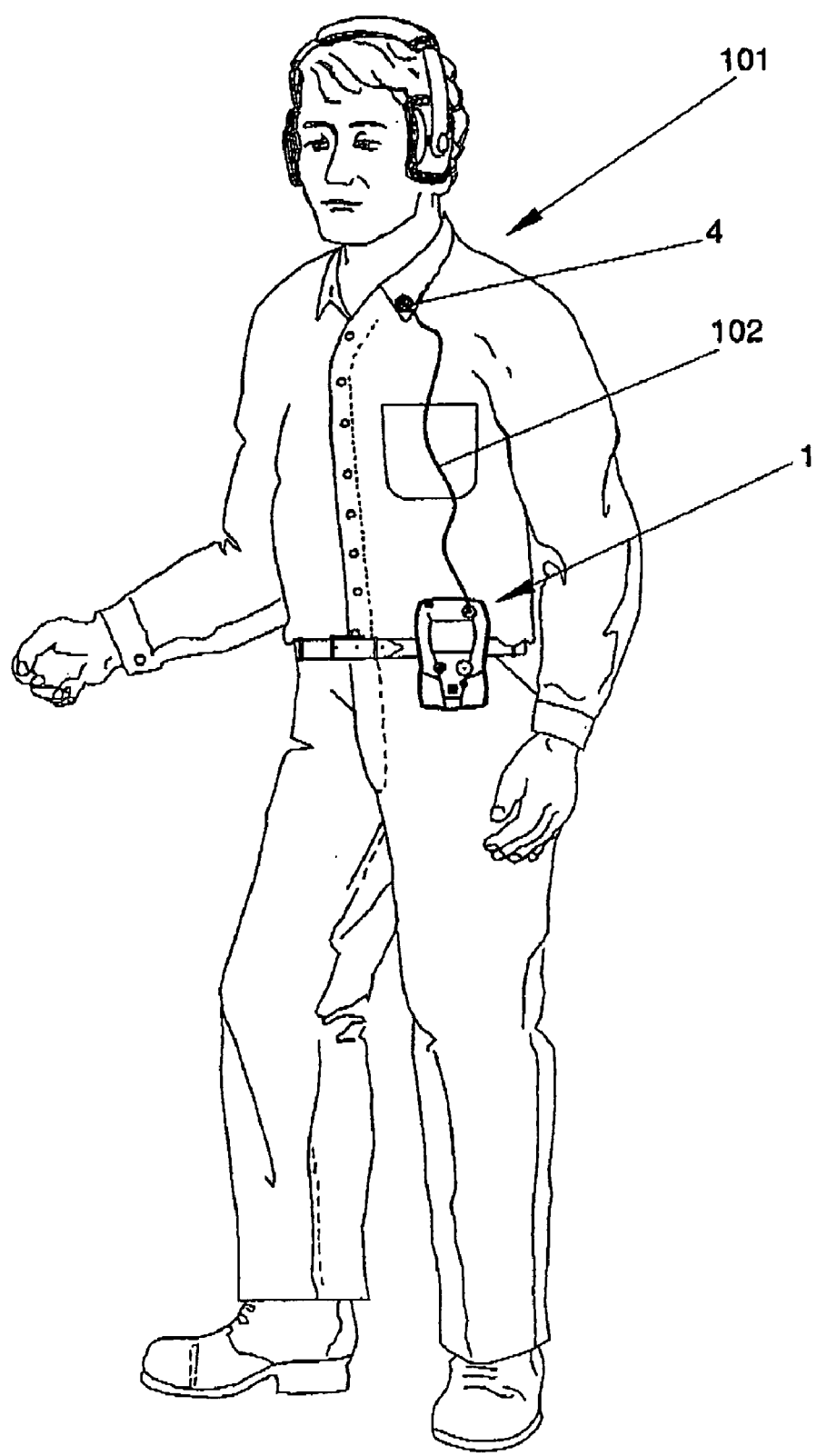
FIG. 5 is a further schematic view showing the device of FIG. 1 as worn by a user with a microphone of the device in an extended position of operation.
Figure 6:
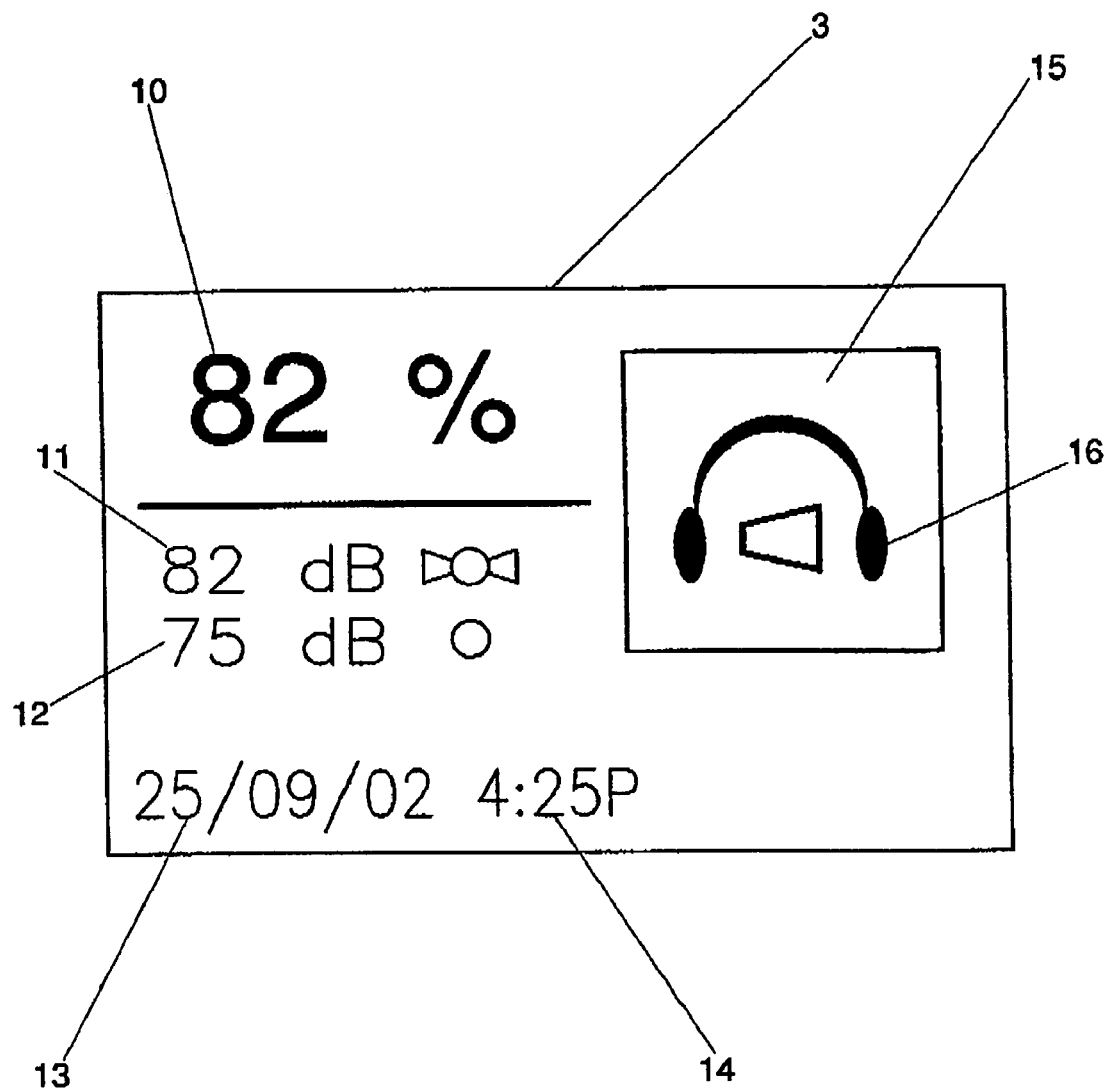
FIG. 6 is a view of a screen display of the device of FIG. 1.

FIG. 5 illustrates an alternative operating configuration of the device 1. The device 1 is mounted at a waist position of a user 101, clipped to a belt. The microphone 4, which is in the form of a removable cartridge, is removed from the device 1 to operate in an extended position, and secured to a collar of the user 101. A cable 102 connects the microphone 4 to noise monitoring and processing circuitry mounted by the housing 100 of the device 1.

The device 1 is therefore intended to be worn at all times by designated individuals during a monitoring period (eg a shift at work) to monitor and document the noise exposure of the user. This contrasts with conventional dosimeters which are only used occasionally to sample noise levels in noisy environments.

The device of the embodiment of FIGS. 1 and 2 is approximately 5 cm wide by 10 cm long by 1.5 cm deep, and its weight is about 100 grams. This enables it to be easily worn by the user without inconvenience. The device can essentially be worn as a "noise badge". Because of it's lightness and compactness it does not impede the user.

The device 1 includes a label 103 for identifying the designated user (see FIG. 2). The label includes a name tag 104 and a employee identifier (such as a "staff number") 105.

The device 1 is arranged to provide the following functions;

1. A compliance measure indicating usage of hearing protection equipment eg. indicating the type of hearing protection equipment (ear muffs, ear plugs, both or none);
2. Data to the individual regarding noise levels and dose with and without the specific hearing protection they are wearing;
3. Noise information data including noise level values, dose value and adjusted values (which take into account hearing protection equipment worn (recommended is SLC80), for uploading to a noise monitoring system; and
4. The ability to acknowledge when an unallowable dose has been reached.

The device 1 also includes an optocoupler (infrared) 9 (on the base of the device) for uploading noise information to a noise monitoring system Which, in this embodiment, is a management software system.

The device 1 is arranged to calculate and display on display 3 a number of noise parameter values. With reference to FIG. 5, the displayed noise parameter values include:

1. The noise dose received 10 (as a percentage). The value is displayed as adjusted for attenuation (recommended is SLC80) of the specific type of hearing protection being worn (if any).
2. The present received sound level without ear protection 11.
3. The present sound level adjusted for hearing protection equipment 12.

The display may also include the date 13 and the time 14. A hearing protection equipment display indicator 15 displays icon 16 which indicates type of hearing protection (or none) being worn by the user at any given time.

In use, with the device worn in the positions described above and illustrated in relations to FIGS. 3, 4 and 5, the display 3 can be viewed by other personnel in the area, as well as by the user. The users, supervisors and work mates can therefore monitor the users received noise level and dose values, as well as compliance with wearing of hearing protection equipment.

Figure 8:
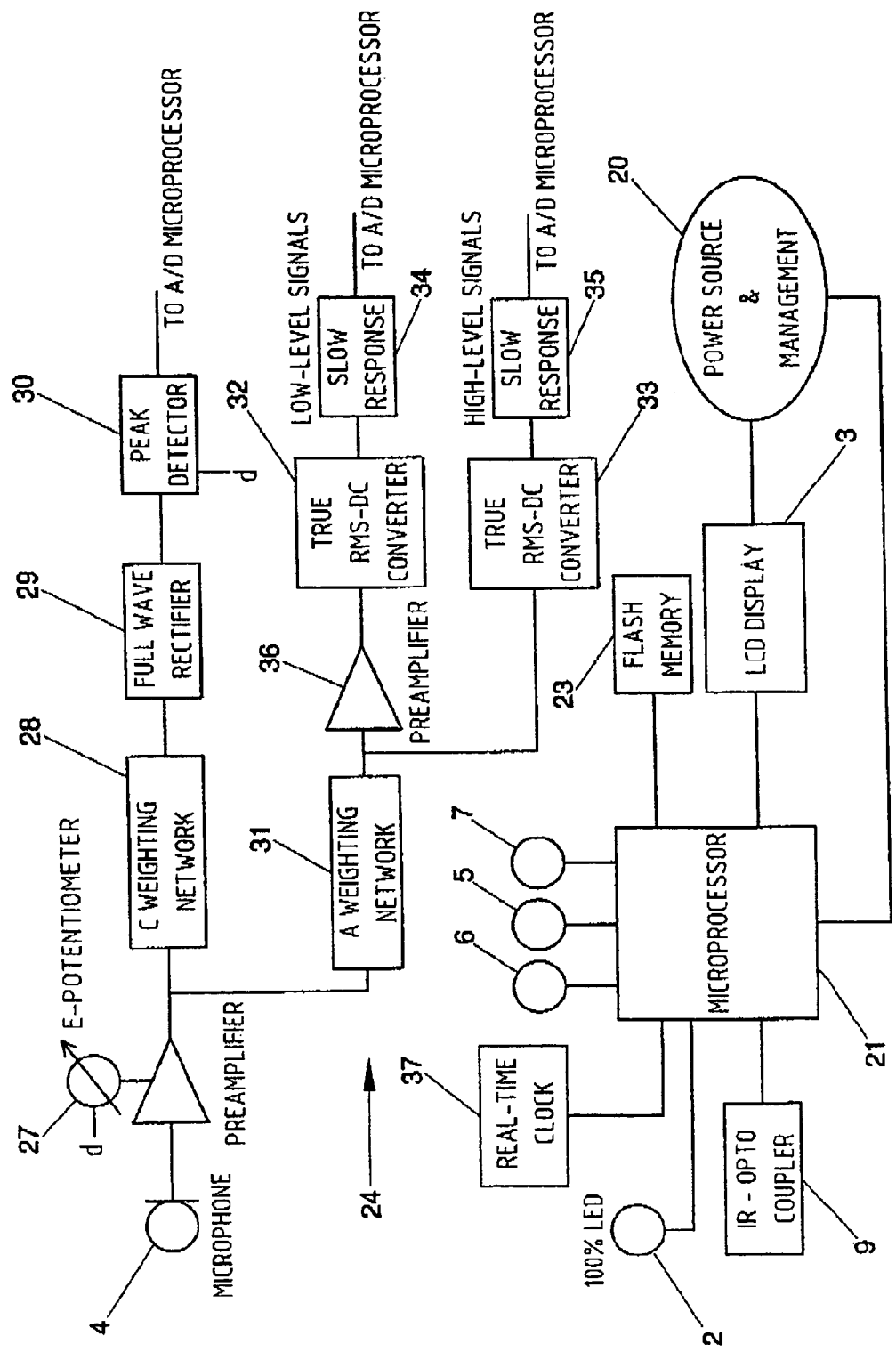
FIG. 8 is a schematic block circuit diagram of the components of device 1.

FIG. 8 is a schematic block circuit diagram of components of the device 1. The device includes a power source 20 which in the preferred embodiment is a 3.6 volt lithium thyoneal cell. A microprocessor 21 (TI-MSP 430 F 149) controls the power management, acquisition of data (ie. three channels; peak levels, high and low value dBA weighted values, the LCD screen 3 and other peripheral devices such as the optocoupler 22 for up load and down load of data and external EEPROM 23 for data storage).

Analogue noise monitoring circuitry (generally designated by reference numeral 24) includes an electret microphone 25. The signal from the microphone is amplified by pre-amplifier 26 adjusted to a power level through an electrically programmed EE potentiometer 27 for calibration. The EE potentiometer 27 is programmed or modified for real-time "device check" with the use of an external calibrator (described later). The signal is passed through a C-weighting network 28 and full wave rectifier 29 and measured by a peak detector circuit 30 which samples and holds the value of the signal. The peak value is stored until the level is read and reset via a pin d on circuit 30 by the microprocessor 21.

Additionally the microphone signal is weighted through a filter network 31 that applies a filter according to the A-weighted design specification. The signal is then further separated into two channels, representing a high and low level signal. Internal software determines which of these outputs to use. Each of these separate channels has a separate true RMS to DC converter 32, 33 and slow response characteristic 34 for measuring noise parameters. RMS signal post amplification is used to condition the signals at the correct levels appropriate for the A/D converters of the microprocessor. The low level signal channel also includes a signal conditioning pre-amplifier 36. The pre amplification brings the low level signals within the range of the microprocessor and effectively increases the range of signal level that the microprocessor is able to detect.

The microprocessor 21 performs calculations each 250 milliseconds, including 1) measuring the dB-A weighted value, 2) detecting the measured peak levels 3) calculating the integrated or time weighted value, 4) calculating the percent allowable exposure for the individual, 5) checking the status of the type of ear protection and adjusting the calculated values accordingly, and 6) checking for acknowledgment of over limit (100 per cent) exposure.

The microprocessor is also data logging each 10 seconds (settable value) and is polling the IR-optocoupler 9 to check for upload or download requirements. A time of day clock and date 37 is written to the LCD screen 3 and is updated each second.

Input keys 5, 6 and 7, input signals to the microprocessor for power on or off (input key 6) selection of hearing protection equipment (input key 5) and acknowledgment of exceeding of noise dosage limit(input key 7).

The allowed noise dose is calculated under software control by the microprocessor based on the appropriate standards for the jurisdiction that the device is operating in. The calculation of noise dose takes into account the intensity of the sound which the user is exposed to and the time for which the user is exposed to the sound. In order to avoid hearing damage, the higher the sound intensity, the less time the person can be exposed. The device 1 utilises a table of equivalent noise exposures which relate sound level to time, in calculating the noise dose. An example table is as follows:

TABLE 1

| Sound Level | Allowed Time Exposure |
|---|---|
| 85 dB (A) | 8 hours |
| 88 dB (A) | 4 hours |
| 91 dB (A) | 2 hours |
| 94 dB (A) | 1 hour |
| 97 dB (A) | 30 minutes |
| 100 dB (A) | 15 minutes |
| 103 dB (A) | 7½ minutes |
| 106 dB (A) | 4 minutes |
| 109 dB (A) | 2 minutes |
| 112 dB (A) | 1 minute |
| 115 dB (A) | 30 seconds |

This table assumes a noise exposure criterion $L_{aeq.8h}$ of 85 dB(A) and exchange rate of 3 dB.

The calculation of noise dose percentage is based on table 1 (or the equivalent in the appropriate jurisdiction) and the following equation:

Percentage Dose is expressed as:

$$\text{Dose (\%)} = \frac{100}{S} \int_0^r 2^{\frac{P_0-P_1}{E_x}} dt$$

Percentage Dose that has been adjusted for the attenuation due to the type of ear protection that is being worn.

$$\text{Dose (\%)} = \frac{100}{S} \int_0^r 2^{\frac{(P_0-Aj_t)-P_1}{E_x}} dt$$

Where:
S=Number of samples (1 per sec, eg, 28800)
R=run time in sec
$E_x$=exchange rate (3,4,5,6 or 6 dB)
$P_0$=Sound Pressure Level (64 dB–134 dB)
$P_1$=Criterion Level (64 dB–134 dB)
Ajt=Adjustment due to ear protection (0 db–50 db)

The calculated values are adjusted for the type of ear protection that is worn, in accordance with SLC 80 standards. The SLC 80 standards are used to adjust the dB(A) values in table 1, and the calculation algorithm is subsequently performed to calculate the adjusted noise dose.

Figure 7F:
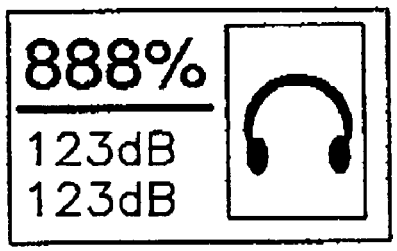

FIGS. 7A to 7E illustrate various displays which are presented by the device 1 during a set up process undertaken before use of the device by a user in a monitoring period (eg. workshift). FIG. 7A shows a "start-up" screen which is initiated by actuation of the power on or off key 6. A battery power level icon 200 indicates available battery time.

FIG. 7B illustrates a menu screen. A blackened circle 201 indicates a highlighted icon. By default the top (set-up) icon 202 is highlighted. Input key 5 is actuated to toggle the highlighting between top icon 202 and bottom icon 203. Input key 7 is operated to select a function implied by an icon. If the top icon 2 is selected, the device proceeds to a "setup" routine and if the bottom 203 icon is selected the device proceeds to a "calibration check" routine.

FIG. 7C illustrates a display for the setup routine. In the setup mode, two digit attenuation values are entered into device 1 for attenuation adjustments to be used in calculating noise dose values taking into account the effect of hearing protection equipment. The values input will depend upon the hearing protection equipment which is available to the user, and in this embodiment, it is recommended that they are based on the SLC 80 standards. In the example shown, the hearing protection equipment which is allowed for and which requires a two-digit value to be entered are ear muffs (icon 204), ear plugs (icon 205) a combination of them, or no hearing protection equipment.

Any previously saved setup values are displayed and setup begins by default with the ear muffs set up. Input key 7 increases the dB option by increments of 1, and once this has reached its maximum of 50 dB it will rotate back to 0 dB. Input key 5 saves the entered value and moves to the ear plug 205 setup. Again, key 7 increases dB by increments of 1 and once the maximum of 40 dB is reached the option will rotate back to 0 dB. Input key 5 stores the value and returns the display to the menu display of FIG. 7B.

Entry of the attenuation values for the hearing protection equipment is best performed by management eg. a work supervisor.

FIG. 7D illustrates the screen which is displayed following selection of the calibration check icon 203 in the screen of FIG. 7B. This screen is used to calibrate the device 1. The device 1 may be calibrated before every monitoring period (eg. workshift), by the user. To calibrate, the calibrator is docked with the device 1 and calibration proceeds. Once calibration is complete the "tick" icon 206 appears. The display remains as in FIG. 7D for 3 seconds before returning to the menu display of FIG. 7B.

Calibration devices are known for conventional noise dosimeters. For the device of the present embodiment, the calibrator is designed as a hand held unit that makes contact with the microphone module for permitting an appropriate acoustical volume to be established. This insonified cavity with its known frequency and intensity is utilised to check and verify the integrity of the device. The calibrator is battery powered. It utilises a crystal clock to produce a square wave of 1000 hertz. The square wave is applied as input to an eight pole elliptical filter that produces a sign wave signal. The signal is reproduced through a miniature output transducer. Calibrators are known.

Figure 7G:
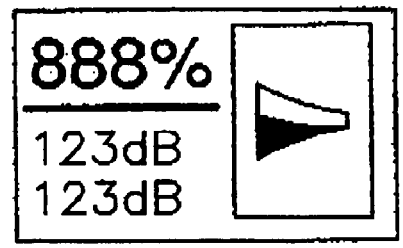

If calibration fails, the "service" icon 207 as illustrated in FIG. 7E, is displayed for 4 seconds before the device displays the menu display of FIG. 7B. The service icon 207 indicates that the device 1 should be serviced (eg. field replacement of battery or microphone). In this embodiment, the device will not operate for a user if servicing is required. On the next start up of the device 1, for example, the start up screen of FIG. 7A is displayed for 4 seconds during which time the user enters the setup and calibration check by simultaneously pressing keys 5 and 7. Otherwise, the service screen of 7E is displayed for 4 seconds and the device will proceed to the "shut-down/sleep" screen of FIG. 7I, before turning off.

Figure 7H:
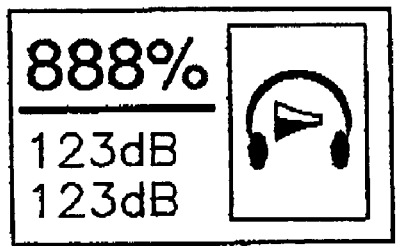
Figure 7I:
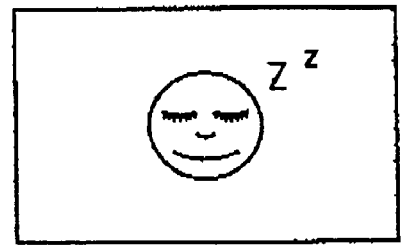

In operation, as discussed above the device is intended to be worn when any noise monitoring of a person is required, which will usually be through the total extent of the person's work shift. Key 6 is pressed to switch on the power to the components. If hearing protection is to be worn key 5 is actuated by the user, and actuation of the key results in the display scrolling through a plurality of icons representative of hearing protection that may be worn. For example, in one embodiment the icons include representations of ear muffs, (FIG. 7F) ear plugs (FIG. 7G) and a combination of both ear muffs and ear plugs (FIG. 7H). In the display of FIG. 5, the icon shown is a combined ear muff and ear plug icon, which indicates that the person who has selected this icon is to wear both ear muffs and ear plugs. The ear muff icon selected on its own would indicate that the person is wearing ear muffs only and the ear plug icon selected on its own would indicate that the person is wearing ear plugs only. There is a "no protection" option where an "x" icon is displayed.

As the display can been seen by other people in the workplace (as well as the user), if the person is not wearing the hearing protection that is represented as an icon on the display they can be advised by the supervisor and workmates. The person may vary the displayed icon throughout their workshift. For example, if they move from a less noisy environment where they are displaying an "x" icon (no protection) to a noisy environment where they wear ear muffs, then they will actuate the key 5 in order to ensure that the ear muff icon is displayed. The device will log the actuations, and can therefore monitor compliance with the wearing of noise protection equipment.

Throughout the person's shift, the noise levels and dose and adjusted values received by the user are monitored and logged. As discussed above, the display includes present values of sound levels 11 in dB, both unprotected and adjusted for the chosen attenuation (recommended SLC 80) value of the hearing protection equipment 12. Unadjusted and adjusted noise dose values are displayed as a percentage 10 of allowable dose. If the adjusted noise dose exceeds 100%, the LED 2 on top of the device 1 flashes continuously until the end of the work shift (under control of microprocessor 21). Note that the noise dose value continues to be calculated, and the read out may increase over the 100% level.

In response to the indication that 100% level has been reached, the worker actuates the acknowledgment key 7. The microprocessor logs that the user has acknowledged receiving the 100% noise dose. This provides an indication to management that the user is aware that their allowable noise dose has been reached. It will be documented (by storage of data in the device 1) if the worker continues working under the same conditions. The memory 23 is arranged to store up to 60 days worth of logged data. This data can be periodically uploaded to a noise management system. The data may be uploaded at the end of each shift, weekly or at any convenient period within the ambit of the memory 23.

Figure 9:
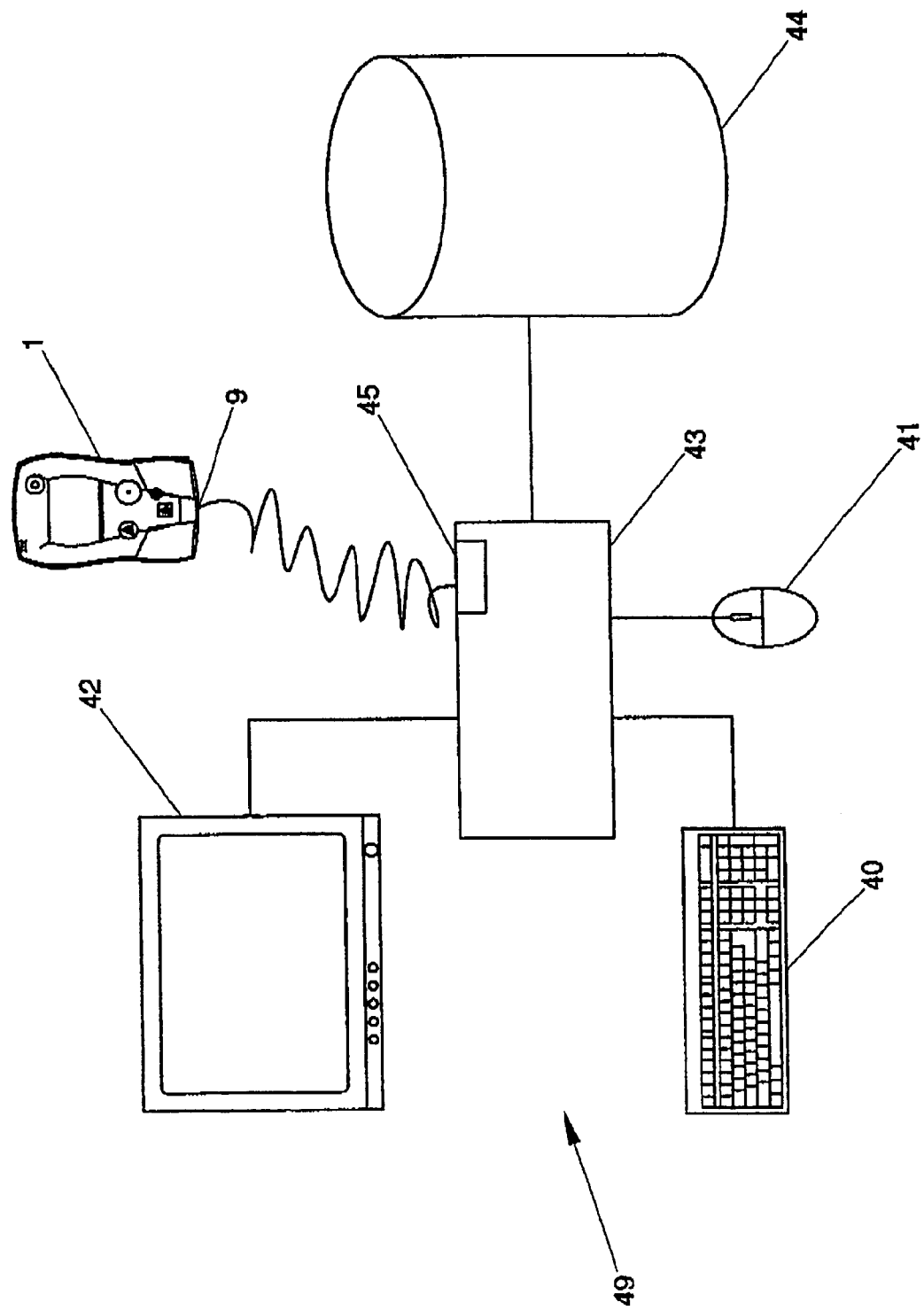
FIG. 9 is a block circuit diagram of components of the device of FIG. 1.

A schematic block diagram of a noise monitoring system in accordance with an embodiment of the present invention is shown in FIG. 9. The noise monitoring system may be implemented by a desktop computer system or laptop computer. The components may include an interface, including a keyboard 40 and mouse 41, and a visual display unit 42. A processing means 43 is connected to the interface and also to a database 44. Where the system is implemented via a desktop computer system, the database 44 and processing means 43 will be implemented by computer hardware and software, as will be appreciated by the skilled person. An infrared (IR) port 45 is arranged for IR communication with IR port 9 on devices 1.

In operation, data from a plurality of devices 1 (from the devices associated with all the persons being monitored in the workforce) are uploaded periodically to the noise monitoring system via the IR port 45.

The data that is uploaded includes the following:
1. Present noise levels that workers are exposed to throughout a pre-determined time period (eg. their work shift).
2. Present noise levels that may be associated with a defined event;
3. The percentage noise dose values received during a pre-determined time period.
4. Attenuation (recommended is SLC 80) of the type of hearing protection equipment used. In this embodiment, this will be in the form of a two-digit number (dB attenuation.
5. The compliance to ear protection in noise risky environments.

This information can be used to individually monitor each person in the workforce.

Figure 10:
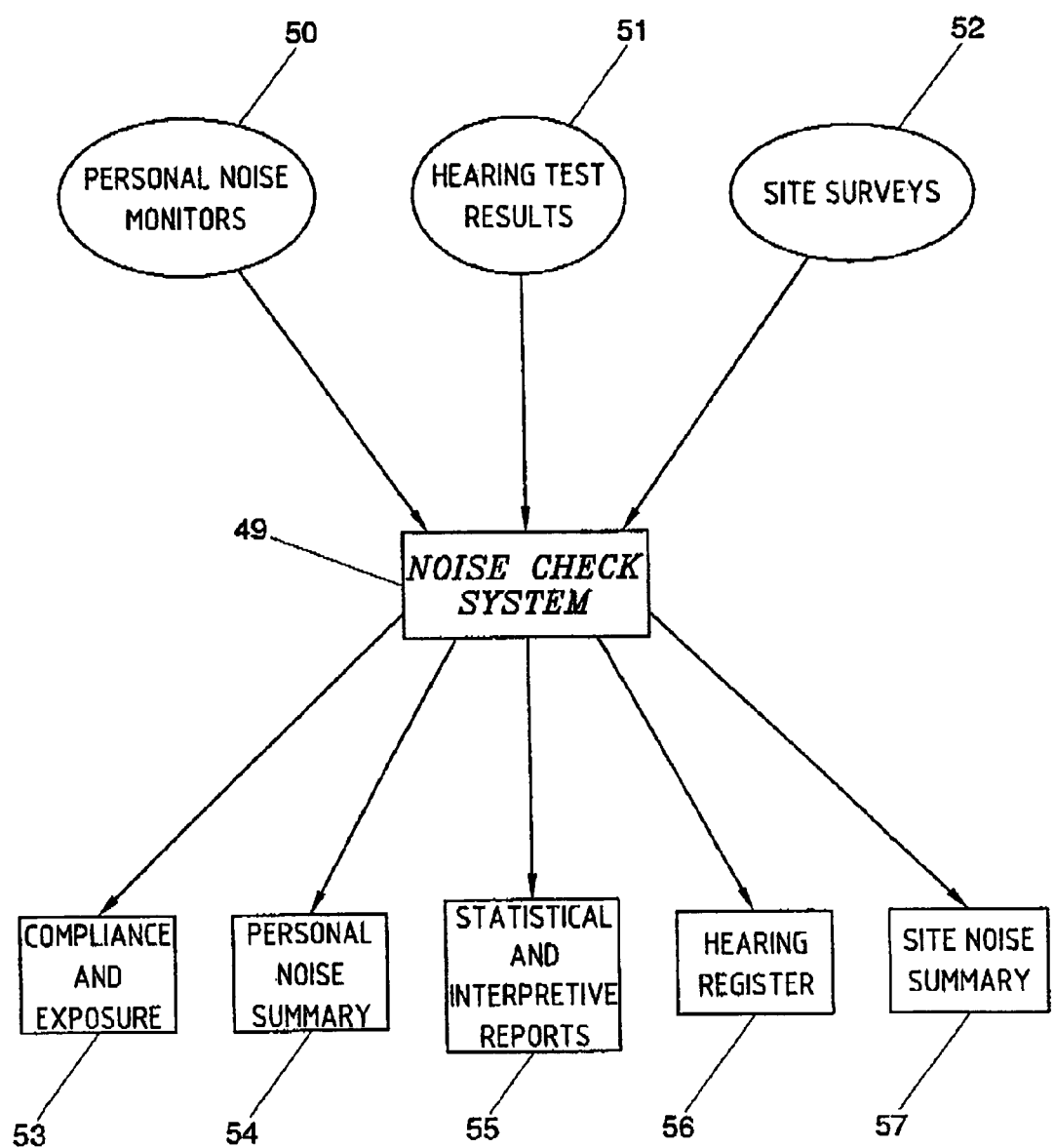
FIG. 10 is a block diagram of a noise monitoring system in accordance with an embodiment of the present invention.

With reference to FIG. 10, as well as inputs 50 from the noise monitoring devices, the noise monitoring system also receives the results 51 from the regular hearing tests that personnel undertake. These data are the result of the workers' annual or biannual hearing tests that form part of a hearing conservation program. From these data it is possible to determine if each worker has or is developing a permanent noise-induced hearing (PNIHL).

Site survey information 52 is also input into the noise monitoring system. This information details the noise levels of nominated areas within the workplace. Usually this involves defining sites of interest and collecting noise samples over time from various locations within the site. The site would usually be re-surveyed if there were significant changes. For management decision-making (eg. where to relocate an employee with hearing loss to reduce noise exposure) the sites are ranked relative to each other in terms of their noisiness.

The primary outputs of the system are as follows:
1. Reports on compliance with wearing hearing protection equipment and exposure to noise (reference numeral 53).
2. A personal noise summary (reference numeral 54).
3. Statistical and interpretive reports (reference numeral 55).
4. A hearing conservation register 56.
5. A site noise summary ("site sound survey") 57.

Table 2 and Table 3 (below) indicate tables in the noise monitoring system database which contain summary data relating to the noise information collected during each user's work shift (Table 2) and the detailed records loaded from a noise monitoring device 1, containing noise related data collected in a sampling interval (table 3).

TABLE 2

| Field | Size | Type | Description |
| --- | --- | --- | --- |
| Serial_No | 15 | Text | Unique device identifier. |
| Start | | Timestamp | The date and time that the employee started their shift. |
| End | | Timestamp | The date and time that the employee ended their shift. |
| Sample-Interval | 2 | Integer | Defines the time in seconds between noise sample detail records. |
| Ear_Muff_Type | 60 | Text | Description of the type of ear muffs in use by this employee. |
| Ear_Muff_Att_Val | 1 | Integer | A value representing the amount of noise reduction provided by the ear muffs. |
| Ear_Plug_Type | 60 | Text | A description of the type of ear plugs worn by the employee. |
| Ear_Plug_Att_Val | 1 | Integer | A value representing the amount of noise reduction provided by the ear plugs. |
| Upper_Limit_Level | 2 | Integer | A maximum dB value above which the system accrues the number of seconds exposure into the upper_limit_time field of the detail record. |
| Criterion | 1 | Integer | A constant sound level if applied for 8 hours would accumulate 100%, in range 70–100. |
| Threshold | 1 | Integer | A preset dB level below which sound is not accumulated or averaged, in range 70–100. |
| Exchange_Rate | 1 | Integer | The number of dB that a sound must change to either half or double the rate of dose accumulation, must be (3, 4, 5 or 6). |

TABLE 3

| Field | Size | Type | Description |
| --- | --- | --- | --- |
| Serial_No | 15 | Text | Unique device identifier. |
| Start | | Timestamp | The date and time that the employee started their shift. |
| Seq-No | 2 | Integer | Defines when during this shift the sample was taken. |
| Noise_Level_dBA | 4.1 | Decimal | A numeric value of the form 999.9 that represents the average noise level sampled. |

TABLE 3-continued

| Field | Size | Type | Description |
| --- | --- | --- | --- |
| Max_Noise_Level | 4.1 | Decimal | The maximum noise level experienced during the sample interval |
| Percantage_Level | 2 | Integer | The percentage level of exposure for this employee at the time of sampling. This value may exceed 100%. |
| Protected_Noise_Level_dBA | 4.1 | Decimal | The average noise level sampled adjusted to account for the hearing protection worn. |
| Protected_Max_Noise_Level | 4.1 | Decimal | The maximum noise level experienced during the interval adjusted to account for the hearing protection worn. |
| Protected_Percentage_Level | 2 | Integer | The percentage level of exposure for this employee adjusted for the hearing protection worn. |
| Ear_Muffs_On | 2 | Integer | The number of seconds during the interval that the employee was wearing ear muffs. |
| Ear_Plugs_On | 2 | Integer | The number of seconds during the interval that the employee was wearing ear plugs. |
| Upper_Limit_Time | 2 | Integer | The number of seconds during this sample interval for which the employee was exposed to noise levels in excess of the upper limit value defined in the header data. |
| Peak_Level | 1 | Integer | The value that if reached sets the Peak (t/f) |
| Peak | 1 | Text | A true/false value that indicates if the employee was exposed to a noise level during this interval that was greater than Peak_Level dB. |

FIGS. 12A and 12B are extracts from example reporting produced by the noise monitoring system. FIG. 12A is a table showing exposure over a 100% noise dose. The table includes a "compliance" column which includes fields for logging compliance with wearing hearing protection equipment. In FIG. 12A, it can be seen that the employee complied with the requirement to wear hearing protection equipment (data in the fields is "yes").

FIG. 12B is a "non compliance and exposure" table which also includes a field for "compliance" and in this case the field values indicate that the employee did not comply ("no") with the requirement to wear hearing protection equipment. The noise monitoring system produces reports like this which can be used to facilitate a hearing conservation program. Following up from such reports, management may take action to ensure protection of employees hearing.

Note that compliance may not be a simple "yes" "no" data entry. Compliance can be expressed as a percentage, eg. the number of times that the employee was exposed to greater than 85 dBA and wore ear protection.

In the above embodiment, the hearing protection types available for designation by the device are ear plugs, ear muffs or a combination of both (or none). It will be appreciated that a device in accordance with an embodiment of the present invention may allow designation of further types of hearing protection equipment.

Modifications and variations as would be apparent to a skilled addressee are deemed to be within the scope of the present invention.

The invention claimed is:

1. A noise monitoring device arranged to be carried by a user, comprising a monitoring means for monitoring a noise parameter, and a hearing protection determination means for determining user compliance with wearing of hearing protection equipment, the hearing protection determination means including a designation means enabling a user to designate to the device one of a plurality of types of hearing protection equipment, whereby to indicate to the device the type of hearing protection equipment they are wearing.

2. A noise level monitoring device in accordance with claim 1, wherein the device includes an external display which is arranged, in response to the designation means to display an indicator of the type of hearing protection equipment designated.

3. A noise monitoring device in accordance with claim 2, wherein the indicator indicating the type of hearing protection equipment designated is an icon representative of the type of hearing protection equipment.

4. A method of monitoring noise exposure of personnel, comprising the steps of assigning each person of the personnel a noise monitoring device, which the person is required to carry for a monitoring period, the device including a hearing protection determination means for determining a user compliance with wearing of hearing protection equipment, wherein the hearing protection determination means includes a designation means enabling a user to designate to the device one of a plurality of types of hearing protection equipment, whereby to indicate to the device the type of hearing protection equipment that they are wearing, the method including the further step of monitoring the designation of the hearing protection equipment by the user.

5. A method in accordance with claim 4, wherein the step of monitoring the designation is carried out by monitoring hearing protection equipment data stored in the device in response to the designation by the user of hearing protection equipment.

6. A method in accordance with claim 4, where the device is arranged to store noise parameter values, the method including the further step of monitoring the noise parameter values stored by the device.

7. A method in accordance with claim 6, wherein the noise level parameter values include the value of noise dose received over a monitoring period.

8. A method in accordance with claim 6, wherein the noise level parameter values include present sound intensity values.

9. A method in accordance with claim 6, including the step of adjusting the noise level parameter values taking into account detected noise level parameter values and an attenuation value for designated hearing protection equipment.

10. A method in accordance with claim 6, comprising a further step of designating an allowed noise dose value for each person.

11. A method in accordance with claim 10, comprising the further step of monitoring whether persons have acknowledged that they have reached their allowed noise dose.

12. A method in accordance with claim 11, wherein the device includes an acknowledgment means to enable the person to acknowledge that they have reached their allowed noise dose, and the step of monitoring whether the person has acknowledged includes determining whether the acknowledgment means has been actuated.

13. A method in accordance with claim 6, including the further step of the noise monitoring device being worn externally of the user's clothing below the level of their head.

* * * * *